(12) United States Patent
Schroder et al.

(10) Patent No.: US 6,266,971 B1
(45) Date of Patent: Jul. 31, 2001

(54) REFRIGERANT CHARGE VALVE

(75) Inventors: Fred Georg Schroder, Grosse Ile, MI (US); Zhongping Zeng, Windsor (CA); Joseph Nader, Jr., Port Sanilac, MI (US)

(73) Assignee: Visteon Global Technologies, Inc., Dearborn, MI (US)

(*) Notice: Subject to any disclaimer, the term of this patent is extended or adjusted under 35 U.S.C. 154(b) by 0 days.

(21) Appl. No.: 09/470,626

(22) Filed: Dec. 22, 1999

(51) Int. Cl.$^7$ .......................................... F25B 45/00
(52) U.S. Cl. ................................... 62/292; 62/77
(58) Field of Search ................... 62/292, 77; 137/234.5, 137/454.2

(56) References Cited

U.S. PATENT DOCUMENTS

| | | |
|---|---|---|
| 1,803,577 | 5/1931 | Weatherhead, Jr. . |
| 2,497,441 | 2/1950 | Detweiler . |
| 2,540,649 | 2/1951 | Boylan . |
| 3,092,404 | 6/1963 | MacWilliam . |
| 3,119,411 | 1/1964 | Bock et al. . |
| 3,416,818 | 12/1968 | Conlin . |
| 3,526,419 | 9/1970 | Saguchi . |
| 3,916,641 | 11/1975 | Mullins . |
| 3,996,765 | 12/1976 | Mullins . |
| 3,997,140 * | 12/1976 | Mullins ................................. 62/292 |
| 4,069,686 | 1/1978 | Hoelman . |
| 4,330,144 | 5/1982 | Ridenour . |
| 4,709,947 | 12/1987 | Kniess . |
| 4,726,399 | 2/1988 | Miller . |
| 4,784,412 | 11/1988 | Van Dongen . |
| 5,046,765 | 9/1991 | Usui . |
| 5,090,442 * | 2/1992 | Campau ............................... 137/315 |
| 5,323,808 | 6/1994 | Shimizu . |
| 5,383,338 | 1/1995 | Bowsky et al. . |
| 5,396,922 * | 3/1995 | Ottens ................................ 137/454.2 |
| 5,653,256 * | 8/1997 | Myers et al. ....................... 137/454.2 |

FOREIGN PATENT DOCUMENTS

| | | |
|---|---|---|
| 467 792 | 10/1928 | (DE) . |
| 2 224 440 | 12/1973 | (DE) . |
| 0 276 483 | 12/1987 | (EP) . |
| 4-165191 | 6/1992 | (JP) . |
| 5-141580 | 6/1993 | (JP) . |

* cited by examiner

Primary Examiner—William Doerrler
Assistant Examiner—Melvin Jones
(74) Attorney, Agent, or Firm—Larry I. Shelton

(57) ABSTRACT

A refrigerant charge valve for a refrigerant system includes a housing adapted to receive a refrigerant system component of the refrigerant system having refrigerant flowing therethrough. The housing has a cavity and a passageway fluidly communicating with a refrigerant charge port of the refrigerant system component. The refrigerant charge valve also includes a valve core disposed in the cavity of the housing to open and close the passageway to allow and prevent access to the refrigerant.

18 Claims, 2 Drawing Sheets

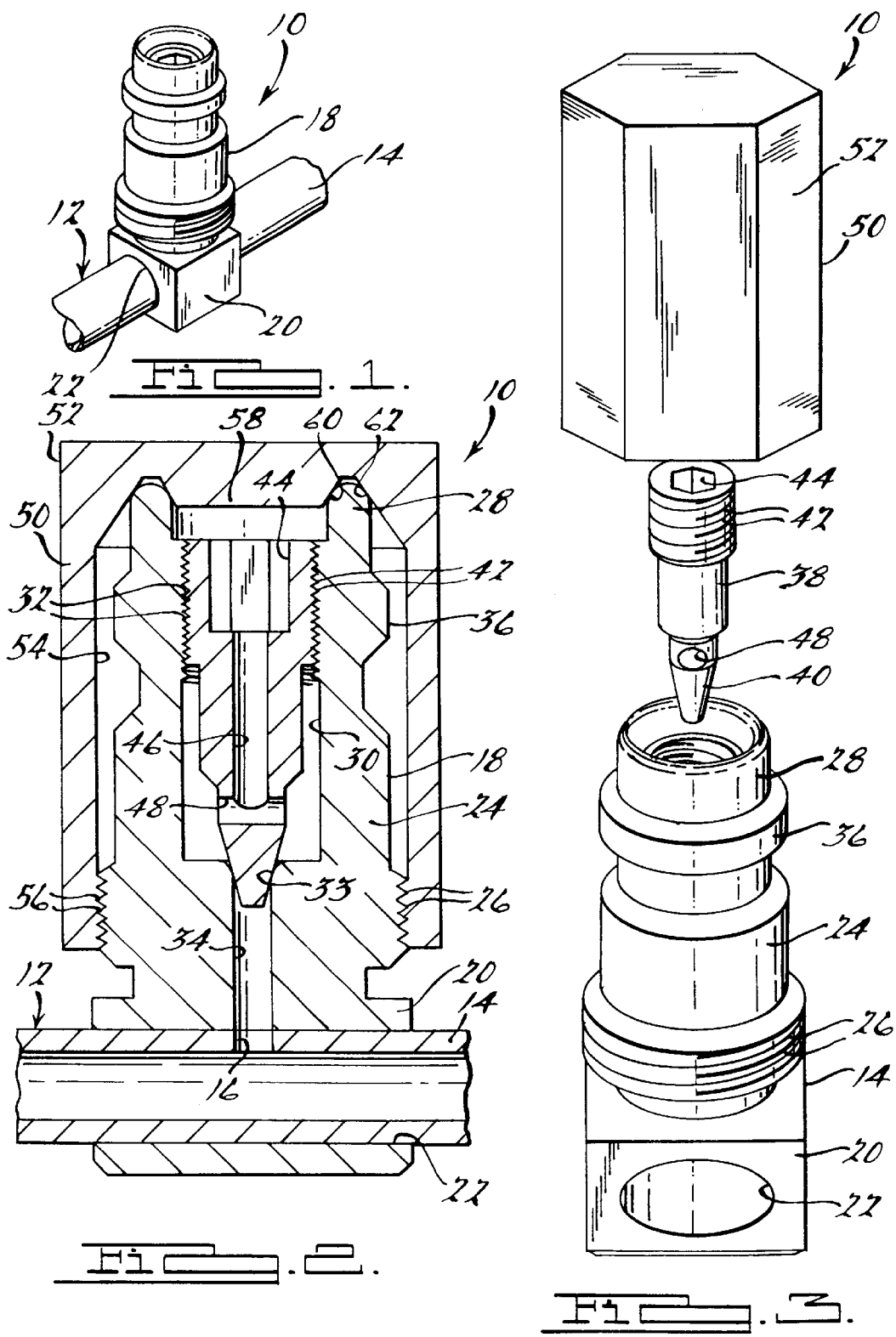

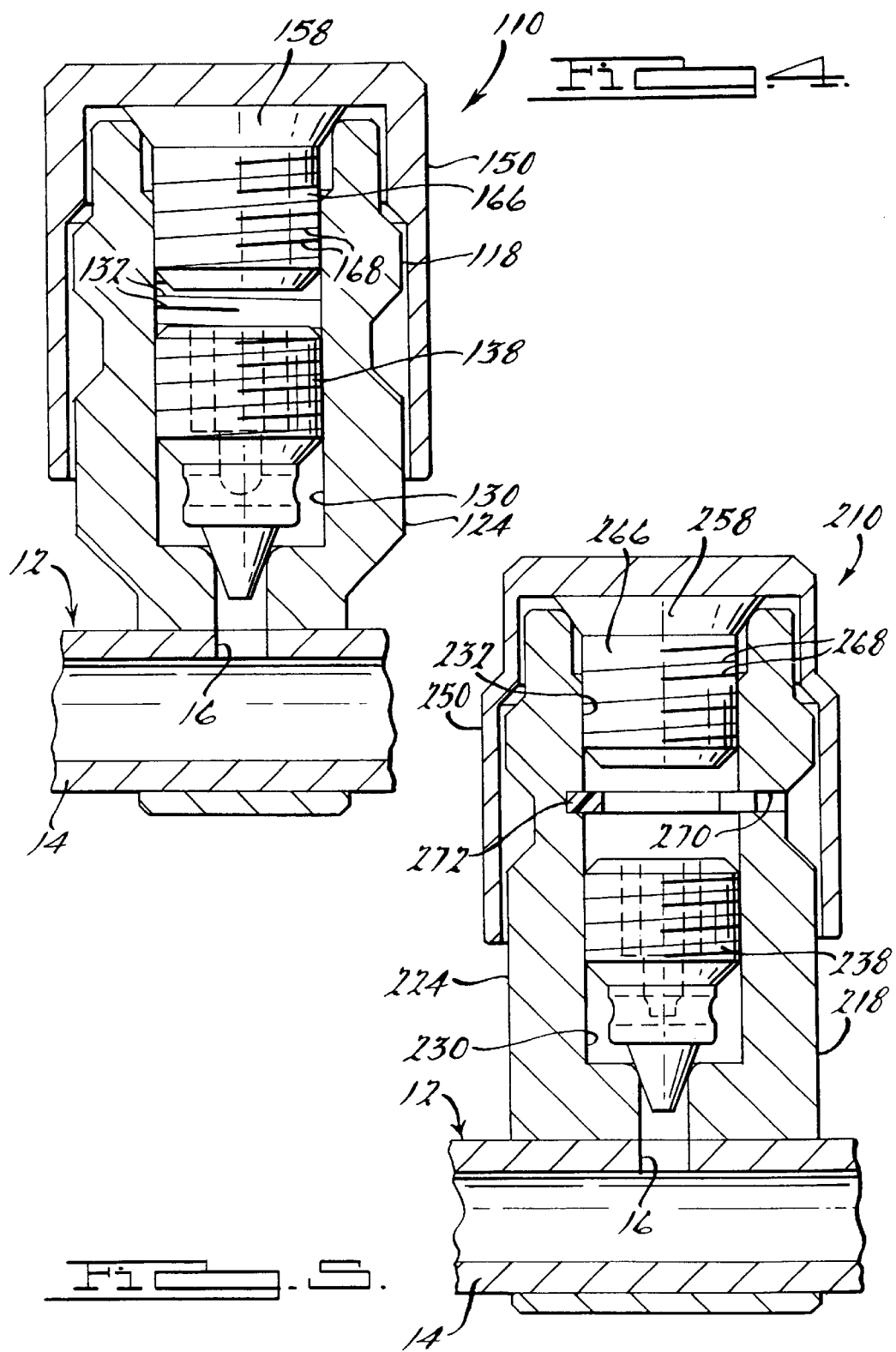

REFRIGERANT CHARGE VALVE

BACKGROUND OF THE INVENTION

1. Field of the Invention

The present invention relates generally to refrigerant systems and, more specifically, to a charge valve for a refrigerant system in a motor vehicle.

2. Description of the Related Art

It is known to provide a refrigerant system in a vehicle such as a motor vehicle. Typically, the refrigerant system includes a plurality of refrigerant system components such as aluminum tubing through which a refrigerant flows. To provide access to the refrigerant system, it is known to provide an aperture in the aluminum tubing and to dispose a refrigerant system device in the aperture. The refrigerant system device is brazed to the aluminum tubing. Also, to charge the refrigerant system, it is known to provide an aperture in the aluminum tubing and to dispose a refrigerant system charging device in the aperture. The refrigerant system charging device is also brazed to the aluminum tubing.

Although the above refrigerant system has worked, it is desirable to provide a charge valve that allows charging of the refrigerant system when transcritical carbon dioxide is used as the refrigerant. It is also desirable to provide a charge valve for a refrigerant system that precludes permeation and has zero leakage. It is further desirable to provide a charge valve for a refrigerant system that uses metal to metal sealing. Therefore, there is a need in the art to provide a charge valve for a refrigerant system of a motor vehicle that meets these desires.

SUMMARY OF THE INVENTION

Accordingly, the present invention is a refrigerant charge valve for a refrigerant system including a housing adapted to receive a refrigerant system component of the refrigerant system having refrigerant flowing therethrough. The housing has a cavity and a passageway fluidly communicating with a refrigerant charge port of the refrigerant system component. The refrigerant charge valve also includes a valve core disposed in the cavity of the housing to open and close the passageway to allow and prevent access to the refrigerant.

One advantage of the present invention is that a refrigerant charge valve is provided for a refrigerant system. Another advantage of the present invention is that the refrigerant charge valve allows charging of a refrigerant system for a motor vehicle when transcritical carbon dioxide is used as the refrigerant. Yet another advantage of the present invention is that the refrigerant charge valve uses metal to metal sealing for primary seal and secondary seals. Still another advantage of the present invention is that the refrigerant charge valve has zero leakage and precludes permeation and decompression.

Other features and advantages of the present invention will be readily appreciated, as the same becomes better understood, after reading the subsequent description taken in conjunction with the accompanying drawings.

BRIEF DESCRIPTION OF THE DRAWINGS

FIG. 1 is a perspective view of a refrigerant charge valve, according to the present invention, illustrated in operational relationship with a refrigerant system.

FIG. 2 is a fragmentary elevational view of the refrigerant charge valve and refrigerant system of FIG. 1.

FIG. 3 is an exploded view of the refrigerant charge valve of FIGS. 1 and 2.

FIG. 4 is a fragmentary elevational view of another embodiment, according to the present invention, of the refrigerant charge valve and refrigerant system of FIG. 1.

FIG. 5 is a fragmentary elevational view of yet another embodiment, according to the present invention, of the refrigerant charge valve and refrigerant system of FIG. 1.

DESCRIPTION OF THE PREFERRED EMBODIMENT(S)

Referring to the drawings and in particular to FIGS. 1 through 3, one embodiment of a refrigerant charge valve 10, according to the present invention, is illustrated in operational relationship with a refrigerant system, generally indicated at 12 and partially shown. The refrigerant system 12 includes a refrigerant system component 14 such as tubing or hoses. In this embodiment, the refrigerant system component 14 is a metal tubing extending longitudinally and having a generally circular cross-sectional shape. The refrigerant system component 14 also includes a refrigerant charge aperture or port 16 extending therethrough into an interior thereof. The refrigerant charge valve 10 is coupled to the refrigerant charge port 16 for charging of the refrigerant system 12 with a refrigerant such as transcritical carbon dioxide. It should be appreciated that the refrigerant system component 14 may include, but are not limited to, tube assemblies, hose assemblies, condensers, evaporators, receiver dryers, accumulators, and compressors.

Referring to FIGS. 1 through 3, the refrigerant charge valve 10, according to the present invention, includes a housing or manifold block 18. As illustrated, the housing 18 has a base portion 20 with a generally rectangular configuration although any other suitable configuration may be used such as cylindrical. The base portion 20 has an aperture 22 extending longitudinally therethrough to receive the refrigerant system component 14. The housing 18 has a stem portion 24 extending generally perpendicular to a longitudinal axis of the base portion 20. The stem portion 24 is generally cylindrical in shape with a generally circular shaped cross-section. The stem portion 24 includes a plurality of external threads 26 near the base portion 20 for a function to be described. The stem portion 24 also includes an annular flange 28 extending axially outwardly from a free end thereof. The stem portion 24 further includes a cavity 30 extending axially therein from the free end thereof. The cavity 30 has a generally circular cross-sectional shape. The cavity 30 has a plurality of internal threads 32 at an opening thereof for a function to be described. The cavity 30 also has a curved sealing seat 33 at a bottom thereof. The stem portion 24 also has a passageway 34 extending axially from the sealing seat 33 of the cavity 30 through the base portion 20 to the refrigerant charge port 16. The housing 18 is made of a metal material such as aluminum. The housing 18 is a monolithic structure being integral, unitary and one-piece. The housing 18 is formed by suitable methods such as impact extrusion, bar extrusion, machining and semi-solid shaping, such methods being known in the art. It should be appreciated that the base portion 20 of the housing 18 is secured to the refrigerant system component 14 by suitable means such as brazing. It should also be appreciated that the stem portion 24 of the housing 18 has an outer surface 36 used for access by a quick connect service tool heads (not shown). It should further be appreciated that the base portion 20 has a rectangular shape to allow the use of a back-up wrench (not shown) when torquing to a cap 50 to be described.

The refrigerant charge valve 10 also includes a valve core 38 removably disposed in the cavity 30 of the housing 18. The valve core 38 is generally cylindrical in shape with a generally circular shaped cross-section. The valve core 38 has a seat 40 at one end extending axially and radially inwardly. The seat 40 is generally cone or frustaconical shaped. The seat 40 seals against the sealing seat 33 in the cavity 30 of the housing 18 to achieve high sealing pressure from a single line contact. The valve core 38 has a plurality of external threads 42 at the other end thereof to threadably engage the internal threads 32 of the cavity 30 to open and close refrigerant charge valve 10. The valve core 38 also has a cavity 44 extending axially inwardly from the end with the external threads 42. The cavity 44 has a hexagonal shaped cross-section to enable an assembly or service tool (not shown) to engage the valve core 38 and set the valve core 38 at different positions. The valve core 38 includes a first passageway 46 extending axially from a bottom of the cavity 44 to a point adjacent the seat 40. The valve core 38 also includes a second passageway 48 extending radially therethrough at an end of the first passageway 46 adjacent the seat 40. The valve core 38 is made of a metal material such as aluminum, brass, stainless steel, etc. The valve core 38 is a monolithic structure being integral, unitary and one piece. It should be appreciated that the first passageway 46 and second passageway 48 are in fluid communication with each other to provide a vent path for evacuation, charging and diagnostics of the refrigerant system 12.

The refrigerant charge valve 10 further includes a cap 50 disposed about the stem portion 24 of the housing 18. The cap 50 is generally cylindrical in shape with a hexagonal shaped outer surface 52 used for wrenching the cap 50 to the housing 18. The cap 50 has a cavity 54 extending axially inwardly having a generally circular shaped cross-section. The cavity 54 includes a plurality of internal threads 56 at an open end thereof to threadably engage the external threads 26 on the stem portion 24 to attach the cap 50 to the housing 18. The cap 50 also includes a stop or seal 58 extending axially inwardly at a closed end of the cavity 54. The seal 58 is generally frusta-conical in shape and has a first tapered sealing surface 60 for engaging and sealing with the flange 28 on the stem portion 24 of the housing 18. The cavity 54 has a second tapered sealing surface 62 spaced radially from the first tapered sealing surface 60 and engaging and sealing with the flange 29 on the stem portion 24 of the housing 18. The tapered sealing surfaces 60 and 62 provide for two secondary refrigerant seals plus an environmental seal and precludes swaging the housing 18 inward or outward so as not to interfere with removal of the valve core 38 or service tool attachment. The cap 50 is made of a metal material such as aluminum, brass, stainless steel, etc. The cap 50 is a monolithic structure being integral, unitary and one-piece. It should be appreciated that the cap 50 has sufficient length to cover the stem portion 24 of the housing 18 to protect the valve core 38 from the environment. It should also be appreciated that a single tapered sealing surface is optional. It should further be appreciated that the tapered sealing surfaces 60 and 62 are to be of a circular and slope combination so that the contact areas are minimized to achieve high sealing pressure.

In operation of the refrigerant charge valve 10, the refrigerant system component 14 is extended through the aperture 22 of the base portion 20 of the housing 18 and the passageway 34 is aligned with the refrigerant charge port 16. The housing 18 is secured to the refrigerant system component 14 by brazing. The valve core 38 is disposed in the cavity 30 and the seat 40 engages the sealing seat 33. At the time of charging or performing other internal accessing services, the cap 50 is not attached to the housing 18 and the housing 18 is connected to a quick connect service coupling (not shown). The valve core 38 is opened by a hex key (not shown) in a service tool (not shown) that can be maneuvered from an open side of the service tool. The hex key is disposed in the cavity 44 of the valve core 38 and the valve core 38 is opened by rotating the valve core 38 such that the seat 40 disengages the sealing seat 33. The hex key is removed from the cavity 44 and refrigerant such as transcritical carbon dioxide connected to the service tool flows through the cavity 44, first passageway 46, second passageway 48, cavity 30, passageway 34 and charge port 16 to the refrigerant system component 14 to charge the refrigerant system 12. Once charged, the hex key is disposed in the cavity 44 and the valve core 38 is rotated to engage the seat 40 with the sealing seat 33. The valve core 38 is wrenched to ensure a primary seal and the cap 50 is disposed over the stem portion 24 and wrenched to provide a secondary seal.

Referring to FIG. 4, another embodiment 110, according to the present invention, of the refrigerant charge valve 10 is shown. Like parts of the refrigerant charge valve 10 have like reference numerals increased by one hundred (100). In this embodiment, the refrigerant charge valve 110 has a housing 118 and valve core 138 with a shorter axial length than the housing 18 and valve core 38 of the refrigerant charge valve 10. The cap 150 includes a projection 166 extending axially from the seal 158. The projection 166 is generally cylindrical in shape with a generally circular shaped cross-section. The projection 166 has a plurality of external threads 168 to threadably engage the internal threads 132 of the cavity 130 of the stem portion 124 of the housing 118 to removably secure the cap 150 to the housing 118. The operation of the refrigerant charge valve 110 is similar to the refrigerant charge valve 10. It should be appreciated that the refrigerant charge valve 110 eliminates the second tapered surface 62 and internal threads 56 of the cap 50 of the refrigerant charge valve 10.

Referring to FIG. 5, yet another embodiment 210, according to the present invention, of the refrigerant charge valve 10 is shown. Like parts of the refrigerant charge valve 10 have like reference numerals increased by two hundred (200). In this embodiment, the refrigerant charge valve 210 has a housing 218 and valve core 238 with a shorter axial length than the housing 18 and valve core 38 of the refrigerant charge valve 10. The cap 250 includes a projection 266 extending axially from the seal 258. The projection 266 is generally cylindrical in shape with a generally circular shaped cross-section. The projection 266 has a plurality of external threads 268 to threadably engage the internal threads 232 of the cavity 230 of the stem portion 224 of the housing 218 to removably secure the cap 250 to the housing 218. The refrigerant charge valve 210 also includes a slot 270 extending radially inwardly into the stem portion 224 of the housing 218 and located axially between the valve core 238 and the projection 266 of the cap 250. The refrigerant charge valve 210 further includes a ring 272 disposed in the slot 270 to keep the valve core 238 from being unthreaded or unscrewed while under system pressure. The operation of the refrigerant charge valve 210 is similar to the refrigerant charge valve 10. It should be appreciated that the refrigerant charge valve 210 eliminates the second tapered surface 62 and internal threads 56 of the cap 50 of the refrigerant charge valve 10.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A refrigerant charge valve for a refrigerant system comprising:

a housing having a base portion with an aperture extending longitudinally therethough adapted to receive a refrigerant system component of the refrigerant system having refrigerant flowing therethrough, said housing having a stem portion extending generally perpendicular from said base portion with a cavity extending axially therein and a passageway having an inlet at said cavity and extending to an outlet at said aperture for fluidly communicating with a refrigerant charge port of the refrigerant system component; and a valve core disposed in said cavity of said housing to open and close said inlet of said passageway and being spaced from the refrigerant system component to allow and prevent access to the refrigerant.

2. A refrigerant charge valve as set forth in claim 1 wherein said cavity has a sealing seat adjacent said passageway.

3. A refrigerant charge valve as set forth in claim 2 wherein said valve core has a seat extending axially therefrom to engage and disengage said sealing seat.

4. A refrigerant charge valve as set forth in claim 1 wherein said cavity includes a plurality of internal threads.

5. A refrigerant charge valve as set forth in claim 4 wherein said valve core has a plurality of external threads to threadably engage said internal threads.

6. A refrigerant charge valve as set forth in claim 1 including a cap removably secured to said housing.

7. A refrigerant charge valve as set forth in claim 6 wherein said housing has a plurality of external threads and said cap has a plurality of internal threads to threadably engage said external threads.

8. A refrigerant charge valve as set forth in claim 6 wherein said cavity has a plurality of internal threads and said cap has a cavity with a projection extending axially into said cavity, said projection having a plurality of external threads to threadably engage said internal threads.

9. A refrigerant charge valve for a refrigerant system comprising:

a housing adapted to receive a refrigerant system component of the refrigerant system having refrigerant flowing therethrough, said housing having a first cavity and a first passageway fluidly communicating with a refrigerant charge port of the refrigerant system component; and a valve core disposed in said first cavity of said housing to open and close said first passageway to allow and prevent access to the refrigerant; and wherein said valve core has a second cavity extending axially therein from one end thereof, a second passageway extending axially from said second cavity and a third passageway extending radially therethrough and communicating with said second passageway.

10. A refrigerant charge valve for a refrigerant system comprising:

a housing adapted to receive a refrigerant system component of the refrigerant system having refrigerant flowing therethrough, said housing having a first cavity and a passageway fluidly communicating with a refrigerant charge port of the refrigerant system component; and a valve core disposed in said first cavity of said housing to open and close said passageway to allow and prevent access to the refrigerant; and wherein said cap has a second cavity with a seal extending axially into said first cavity to engage said housing.

11. A refrigerant charge valve for a refrigerant system comprising:

a housing adapted to receive a refrigerant system component of the refrigerant system having refrigerant flowing therethrough, said housing having a first cavity and a first passageway fluidly communicating with a refrigerant charge port of the refrigerant system component;

a valve core disposed in said first cavity of said housing to open and close said first passageway to allow and prevent access to the refrigerant; and a cap removably secured to said housing and having a second cavity with a seal extending axially into said first cavity to engage said housing.

12. A refrigerant charge valve as set forth in claim 11 wherein said seal has a tapered sealing surface to engage said housing.

13. A refrigerant charge valve as set forth in claim 11 wherein said first cavity has a sealing seat adjacent said first passageway.

14. A refrigerant charge valve as set forth in claim 13 wherein said valve core has a seat extending axially therefrom to engage and disengage said sealing seat.

15. A refrigerant charge valve as set forth in claim 14 wherein said valve core has a second cavity extending axially therein from an end opposite said seat, a second passageway extending axially from said second cavity and a third passageway extending radially therethrough and communicating with said second passageway.

16. A refrigerant charge valve as set forth in claim 11 wherein said housing has a plurality of external threads and said cap has a plurality of internal threads to threadably engage said external threads.

17. A refrigerant charge valve as set forth in claim 11 wherein said cavity has a plurality of internal threads and said cap has a cavity with a projection extending axially into said cavity, said projection having a plurality of external threads to threadably engage said internal threads.

18. A refrigerant charge valve for a refrigerant system comprising:

a housing adapted to receive a refrigerant system component of the refrigerant system having refrigerant flowing therethrough, said housing having a first cavity with sealing seat and a first passageway extending axially from said sealing seat and fluidly communicating with a refrigerant charge port of the refrigerant system component;

a valve core disposed in said first cavity of said housing to open and close said first passageway to allow and prevent access to the refrigerant; and said valve core comprising a seat extending axially therefrom to engage and disengage said sealing seat, a second cavity extending axially therein from an end opposite said seat, a second passageway extending axially from said second cavity and a third passageway extending radially therethrough and communicating with said second passageway.

* * * * *